United States Patent [19]
Presby

[11] Patent Number: 5,920,665
[45] Date of Patent: Jul. 6, 1999

[54] MECHANICAL OPTICAL FIBER SWITCH HAVING ENHANCED ALIGNMENT

[75] Inventor: Herman Melvin Presby, Highland Park, N.J.

[73] Assignee: Lucent Technologies Inc., Murray Hill, N.J.

[21] Appl. No.: 08/870,793

[22] Filed: Jun. 6, 1997

[51] Int. Cl.$^6$ ............................................ G02B 6/26
[52] U.S. Cl. .............................. 385/16; 385/19; 385/20
[58] Field of Search ................................ 385/16–24, 14, 385/43, 147

[56] References Cited

U.S. PATENT DOCUMENTS

| | | | |
|---|---|---|---|
| 4,550,483 | 11/1985 | Ingre ........................................ | 29/416 |
| 4,639,074 | 1/1987 | Murphy ................................ | 350/96.15 |
| 4,725,114 | 2/1988 | Murphy ................................ | 350/96.17 |
| 4,762,387 | 8/1988 | Baldorf et al. ........................ | 350/96.2 |
| 5,159,649 | 10/1992 | Uemura et al. ............................ | 385/21 |
| 5,185,825 | 2/1993 | Shigematsu et al. .................... | 385/20 |
| 5,187,758 | 2/1993 | Ueda et al. .............................. | 385/16 |
| 5,461,683 | 10/1995 | Harman .................................... | 385/21 |
| 5,483,608 | 1/1996 | Yokomachi et al. .................... | 385/22 |
| 5,500,917 | 3/1996 | Daniel et al. ............................ | 385/99 |
| 5,623,564 | 4/1997 | Presby ...................................... | 385/20 |

FOREIGN PATENT DOCUMENTS

| | | | |
|---|---|---|---|
| 0 467 672 | 1/1992 | European Pat. Off. ................ | 385/16 |
| 0 747 745 | 12/1996 | European Pat. Off. ................ | 385/16 |
| 40 12 510 | 10/1991 | Germany . | |
| 40 12 511 | 10/1991 | Germany . | |

OTHER PUBLICATIONS

Patent Abstracts of Japan, vol. 012, No. 112 (P–687), Apr. 9, 1988 & JP 62 240918 A (Sumitomo Electric Ind. Ltd.), Oct. 21, 1987, *abstract; figure 1*.

Annex to the European Search Report on European Patent Application No. EP 98 30 4116.

N. Kashima, *Passive Optical Components for Optical Fiber Transmission*, ch. 13, pp. 307–325 (Artech House 1995).

E.J. Murphy, "Fiber Attachment for Guided Wave Devices", *J. of Lightwave Technol.*, vol. 6, No. 6, pp. 862–871 (1988).

K. Shiraishi et al., "Beam Expanding Fiber Using Thermal Diffusion of the Dopant", *J. of Lightwave Technol.*, vol. 8, No. 8 (1990).

H. Hanafusa et al., "Thermally–Diffused Expanded Core Fibres For Low–Loss And Inexpensive Photonic Components", *Electronic Letters*, vol. 27, No. 21, pp. 1968–1969 (1991).

*Primary Examiner*—Phan T. H. Palmer

[57] ABSTRACT

Enhanced alignment of a mechanical optical switch is achievable using two optical fiber structures containing corresponding arrays of optical fibers fixed to first and second substrates cleaved from a common substrate. In an exemplary embodiment, an array of optical fibers is fixed to a common substrate substantially parallel to one another. The resulting structure is cleaved across the optical fiber array to produce cleaved structures. The enhanced optical fiber alignment at the cleaved edges is provided by securing particular respective surfaces of the cleaved substrates to surfaces of two bases aligned in a common plane. Such enhanced alignment occurs in a direction normal to the plane of the surfaces of the bases. Alignment of the optical fibers in a direction parallel to this plane and optical connections between optical fibers of the respective structures occurs by moving the second cleaved structure relative to the first cleaved structure in a direction along the cleaved edges.

34 Claims, 3 Drawing Sheets

MECHANICAL OPTICAL FIBER SWITCH HAVING ENHANCED ALIGNMENT

RELATED U.S. PATENT

The invention is related to commonly assigned U.S. Pat. No. 5,623,564, entitled "Self-Aligned Mechanical Optical Switch", which issued on Apr. 22,1997, to the inventor of the present invention and which is incorporated by reference herein.

FIELD OF THE INVENTION

The invention relates to optical signal routing and more specifically to a mechanical optical switch configuration with enhanced optical fiber alignment.

BACKGROUND OF THE INVENTION

Optical switches have several applications in fiber-optic communication systems. Mechanical optical switches have been used in those switching applications which do not require very high speed switching and which are wavelength and polarization independent. For example, mechanical optical switches have been used in optical fiber routing applications to switch between particular optical signal paths to provide reliable fiber transmission routes for carrying optical signal information. Also, mechanical optical switches are used to provide connection between each one of a plurality of optical fibers and measuring equipment for testing optical fiber routes and/or components connected to the optical fibers.

A variety of mechanical optical switch configurations are commercially available. These switches can typically be characterized as either optical-component-moving-type switches or fiber-moving-type switches. Examples of these types of switches are provided in N. Kashima, *Passive Optical Components for Optical Fiber Transmission*, chap. 13, pp. 307–325 (Artech House 1995), which is incorporated by reference herein. Examples of optical-component-moving-type switches include configurations that employ moveable mirrors or prisms to selectively redirect light signals from an end of a first optical fiber into an end of a second optical fiber wherein the optical fibers are arranged in a parallel manner with their ends adjacent to each other. A similar switch employs an opaque moveable stop that is selectively inserted between ends of optical fibers that face one another. However, known optical-component moving-type switches typically operate as an on-off switches or 1×2 switches and are incapable of providing multiple-port switching, such as in 1×N or M×N switching applications.

Conventional fiber-moving-type switches typically provide multiple-port switching but are mechanically complex, expensive and most have poor alignment requiring frequent adjustment. For example, one known fiber-moving-type switch configuration uses a moveable fiber connector plug having guide pins, and an array of fixed fiber connector receiver plugs having pin receptacles. In operation, the moveable plug is roughly transported to a desired position to mate with a fixed plug and then precisely aligned by pushing it into the fixed plug to insert the guide pins into the receptacles. This complex and expensive switch configuration is described in greater detail in the above cited Kashima reference.

A fiber-moving-type switch manufactured by Dicon Fiber Optics, Inc., Berkeley, Calif. has a configuration based on expanding a beam of light from optical fibers using grated index (GRIN) rod lens. The optical fibers and lens are mounted on a wheel which rotates a desired fiber into a position in which the beam of light is collected with another lens that focuses it onto a receiving optical fiber. Such a switch configuration is expensive to assemble and suffers from poor alignment requiring frequent adjustment.

Accordingly, there is a recognized need for simple, low cost, mechanically stable optical fiber switches that are capable of providing multiple-port switching operations.

SUMMARY OF THE INVENTION

The invention advantageously employs two optical fiber structures having optical fibers fixed to first and second portions of a cleaved substrate to form a mechanically stable self-aligned optical switch having relatively low insertion loss. The optical fibers are fixed to the respective substrate portions substantially parallel to one another and at substantially matching distances to a particular respective surface on each of the first and second substrate portions proximate the cleaved edges. The particular surfaces of these cleaved optical fiber structures are coupled to corresponding surfaces of first and second bases aligned in a common plane with the cleaved edges adjacent to and facing one another.

Such a configuration advantageously positions the ends of the optical fibers at the cleaved first and second substrates at substantially matching distances to the common plane of the aligned surfaces of the first and second bases. As a consequence, the optical fiber ends are aligned with one another in a direction normal to such base surfaces. The use of first and second substrate portions cleaved from a single structure advantageously facilitates this enhanced alignment. As a result of this enhanced alignment, no further alignment is required in the direction normal to the plane of the base surfaces during operation of the switch.

In operation, the second cleaved substrate is moved relative to the first cleaved substrate in the direction along the cleaved edges to selectively provide connections between the optical fibers fixed thereto as alignment in a directional parallel to the base surfaces. An exemplary method for moving the second cleaved substrate is to employ a moveable base for the base to which it is coupled. Then the moveable base can be moved by, for example, a screw-drive-type mechanism with a threaded shaft engaging an internally-threaded sleeve within the moveable base. In this manner, the shaft can be rotated in a precise manner to accurately position the moveable base to achieve the desired optical fiber connection and alignment. Accordingly, the invention provides a low cost, mechanically simple and stable self-aligning switch configuration that is able to provide multiple-port switching.

It is possible to fabricate the optical fiber structures according to the invention by, for example, securing arrays of optical fibers to the respective substrate portions with their fiber ends proximate a cleave region prior to, or after cleaving. However, a further enhancement in optical fiber switch alignment is achievable according to another aspect of the invention by securing the array of optical fibers to first and second portions of an uncleaved common substrate. Then, the resulting structure is cleaved along the optical fiber array to form the desired cleaved structure portions. Such a method achieves an advantageous self-alignment between optical fiber ends in the switch.

Additional features and advantages of the present invention will become more readily apparent from the following detailed description and accompanying drawings.

DETAILED DESCRIPTION

The invention is based on the discovery that enhanced alignment of a mechanical optical switch is achievable by using two optical fiber structures containing a plurality of optical fibers fixed to first and second portions of a cleaved substrate. The optical fibers are fixed substantially parallel to one another and at substantially matching distances from particular respective surfaces of the substrate portions. The optical fibers are also fixed to the substrate portions with their ends positioned proximate the cleaved substrate edges. As a consequence, it is possible to produce an optical switch having enhanced optical fiber alignment at the cleaved edges by securing the corresponding particular surfaces of the optical fiber structures to surfaces of first and second bases aligned in a common plane.

This configuration produces the enhanced alignment in a direction normal to the common plane of the such base surfaces. Alignment of the optical fibers in a direction parallel to this plane and optical connections between optical fibers of the respective structures occurs by moving the second cleaved substrate portion relative to the first cleaved substrate portion in a direction along the cleaved edges. It is possible to produce such movement by using, for example, fixed and moveable bases for the first and second bases.

In accordance with the invention, further enhanced alignment between the optical fiber ends is achievable by fixing the array of optical fibers to first and second portions of an uncleaved common substrate. Then, such structure is cleaved along the optical fiber array to form the desired cleaved structure portions. In this manner, the optical fiber ends are positioned at substantially matching distances to a particular corresponding surface of the substrate portions at the cleaved edges. Accordingly, such optical fiber ends are self-aligned at the cleaved edge when the cleaved structures are coupled to respective base surfaces in a common plane.

It is alternatively possible to fabricate the first and second optical fiber structure portions according to the invention by, for example, fixing optical fiber arrays to the respective substrate portions with their ends proximate a cleave line prior to, or after, cleaving. In such a fabrication method, the substrate portions are relied upon for aligning the optical fiber ends at substantially matching distances to the particular respective surfaces of the substrate portions at the cleaved edges. Such an alternative fabrication method requires greater care for fixing the optical fibers for achieving the desired matching distances relative to the previously described self-aligned fabrication method. However, this alternative fabrication method still advantageously facilitates enhanced optical fiber alignment in a switch in accordance with the invention. Further, the facing optical fiber ends at the cleaved edges can be polished to reduce insertion loss in such an embodiment.

Figure 1:
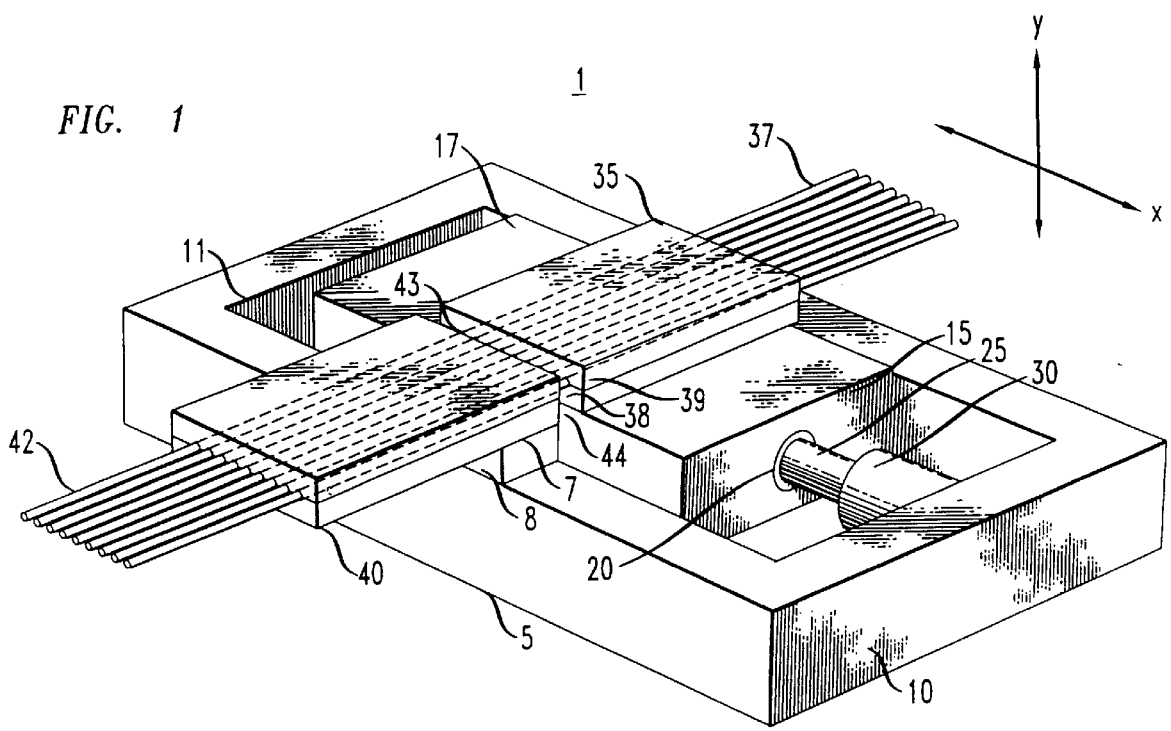
FIG. 1 is a perspective view of an exemplary mechanical optical switch employing cleaved optical fiber structures in accordance with the invention.
Figure 2:
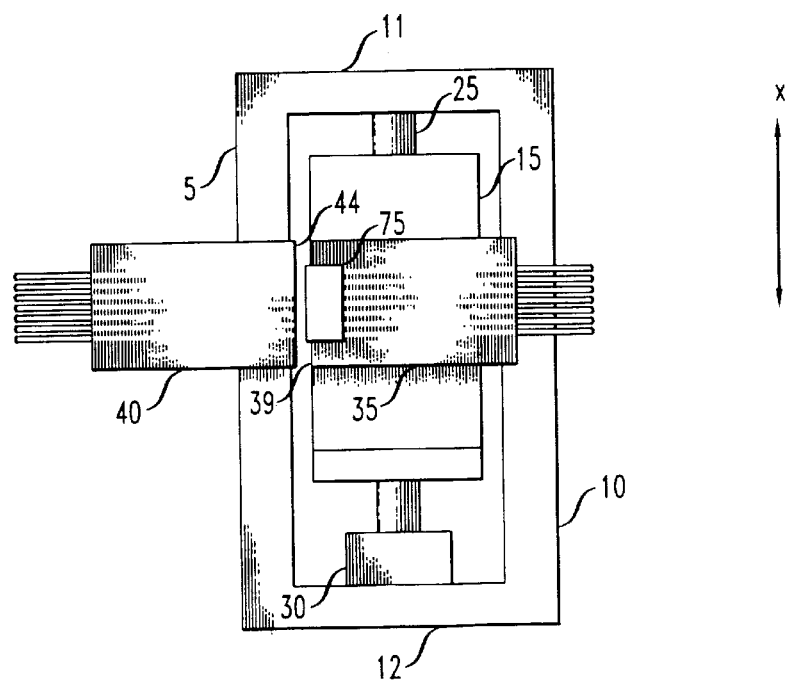
FIG. 2 is a top view of the switch of FIG. 1.

An exemplary mechanical optical switch 1 according to the invention is shown in FIGS. 1 and 2. The switch 1 includes a first fixed base 5 formed integral with or secured to a mounting bracket 10. A second moveable base 15 is movably attached to the mounting bracket 10 so as to move the base 15 in a direction X parallel to the fixed base 5. the bases 5 and 15 have substantially flat top surfaces 7 and 17 that are in a common plane with one another. The surface 7 is a top surface of a spacer 8 of the fixed base 5. One suitable technique for ensuring that surfaces 7 and 17 are in a common plane is, for example, to simultaneously machine or plane both surfaces when arranged in the depicted configuration.

An optical fiber structure 35 containing an array of optical fibers 37 is disposed on the flat surface 17 of the moveable base 15. A corresponding optical fiber structure 40 containing an array of optical fibers 42 is disposed on the flat surface 7 of the fixed base 5. The optical fibers 37 and 42 carry light signals that are to be routed by the switch 1. The mounted optical fiber structures 35 and 40 have fiber ends 38 and 43 at facing edges 39 and 44 that are close to and face one another along the X-direction as shown in FIGS.1 and 2 In order to arrange the optical fibers ends 38 and 43 in an aligned manner, the corresponding optical fiber structures 35 and 40 have first and second substrate portions supporting the optical fibers 37 and 42 cleaved from a single common substrate in accordance with the invention. As a consequence, the optical fiber ends 38 and 43 are at substantially matching distances to the structure surfaces disposed on the base surfaces 7 and 17 at the facing cleaved edges 39 and 44. Exemplary methods for forming the optical fiber structures 35 and 40 are described in greater with regard to FIG. 3.

Accordingly, since the surfaces 7 and 17 of the bases 5 and 15 are in a common plane, the optical fiber ends 38 and 43 are correspondingly maintained at substantially matching distances from the common plane and are in substantial alignment with one another. In particular, the optical fiber ends 38 and 43 are aligned with one another in a direction Y normal to the surfaces 7 and 17. The optical fibers 37 and 42 are depicted in a common plane along the length of the structures 35 and 40 for illustration purposes only which is not meant to be a limitation of the invention. It is possible employ optical fiber structures having optical fibers that are not in a common plane along the lengths of the structures.

However, it is critical according to the invention that those optical fibers in the array of optical fibers 37 and 42 that are required to establish optical connections be arranged at substantially matching distances from the surfaces of the structures 35 and 40 that are coupled to the base surfaces 7 and 17 at the cleaved edges 39 and 44. Deviation from exactly matching distances from the respective particular surfaces of the structures 35 and 40 by one or more optical fiber ends 38 and 43 at the edges 39 and 44 can result in a relative degree of alignment mismatch for establishing connections between such optical fibers ends 38 and 43 during operation of the switch. A relative deviation is permissible based on core diameters of the optical fibers 37 and 42 and acceptable insertion loss for the particular switch connections. For instance, it is possible for substantially matching distances for individual optical fibers to deviate by as much as 5% while still maintaining an advantageous insertion loss of 0.2 dB.

It is desirable for the optical fiber structures 35 and 40 be mounted on the bases 5 and 15 with their cleaved edges 39 and 44 as close together as possible. A gap separation of the cleaved edges 39 and 44 of approximately 10 µm or less advantageously enables a conveyance of light between optical fibers of the respective structures 35 and 40 with a relatively low insertion loss of approximately less than 0.5 dB. Polishing the optical fiber ends 38 and 43 further reduces insertion loss. In order to further reduce insertion loss, a refractive index matching material, such as in a gel or liquid form, can be disposed in the gap between the cleaved edges 39 and 44. A suitable index matching liquid is available from Cargille Scientific, Inc., of Cedar Grove, N.J. Also, it is possible to form the cleaved edges 39 and 44 and optical fiber ends 38 and 43 in a common plane at a complementary angle to a line extending normal to the common plane of the base surfaces 7 and 17 with the cleaved edge surfaces 39 and 44 remaining parallel to one another in order to minimize any back reflections. Suitable complementary angles are in the range of approximately 5° to 15°.

It is possible to produce different connections between the different individual optical fibers of the first and second optical fiber structures 35 and 40 by precisely moving the base 15 and the structure 35 in the X-direction to align the respective ones of the optical fiber ends 38 and 43 of the desired routing connection. The particular mechanism selected to move the base 15 in the X-direction is not critical to practicing the invention and a variety of conventional methods can be employed. An exemplary screw-drive arrangement for moving the base 15 is shown in FIGS. 1 and 2 for illustration purposes only and is not meant to be limitation of the invention.

The illustrated screw-drive mechanism includes a threaded shaft 25 that is rotatably attached to a first end 11 of the bracket 10 and extends through an internally-threaded sleeve 20 of the base 15, seen in FIG. 1. The shaft 25 is further attached to a controllable motor 30, best seen in FIG. 2, which is secured to a second end 12 of the mounting bracket 10. The motor 30 rotates the threaded shaft 25 causing the threaded sleeve 20 to travel across the threads of the shaft 25. As a result, the moveable base 15 also moves along the shaft 25 in the X-direction. The motor 30 enables precise control of the position of the moveable base 15 and optical fiber structure 35 in the X-direction by controlling the number of rotations of the shaft 25. Suitable motors for the motor 30 include, for example, DC and stepper motors.

The particular motor controller (not shown) chosen to control the motor 30 for positioning the base 15 to produce the various optical fiber connections and alignment in the X-direction is not critical for practicing the invention. A suitable motor controller is, for example, a conventional computer, such as a personal computer, with the appropriate hardware and/or software for providing the motor 30 with the necessary movement instructions. In addition, it is possible for the motor controller to determine and achieve the proper alignment in the X-direction by monitoring the amount of stray light that is deflected at the cleaved edges 39 or 44 due to a misalignment. Thus, an optional light detector 75, such as a pin diode, is shown in FIG. 2 mounted above the cleaved edge 39 to monitor stray light. For illustration purposes, the optional light detector 75 has not been shown in FIG. 1.

Although the switch 1 is shown using a spacer 8 to provide the flat surface 7 that is in a common plane with the moveable base flat surface 17, it should be readily understood that other mechanical configurations can be used to provide the flat surfaces 7 and 17 in practicing the invention. For example, it is possible to provide the flat surfaces 7 and 17 using two spacers with one on each base 5 and 15 or the omission of spacers where corresponding mounting portions of the bases are in the same plane. In an alternative embodiment of the invention, a second fixed base is substituted for the moveable base 15 in FIGS. 1 and 2. A surface of the second fixed base is arranged in a common plane with the fixed base surface 7. Then, at least one of the optical fiber structures 35 and 40 is movably disposed on their respective first or second fixed base surfaces. In operation, the movably disposed optical fiber structure 35 and/or 40 is moved across their base surface relative to one another to form the desired optical fiber connections. In a similar manner, it is possible to substitute a second moveable base for the fixed base 5 according to the invention to enable the movement of both optical fiber structures 35 and 40 relative to one another to achieve the desired optical fiber connections.

Several methods are useable for fabricating the optical fiber ends 38 and 43 in the respective structures 35 and 40 at the desired matching distances to respective corresponding surfaces of the cleaved substrates. For instance, it is possible to fabricate the first and second optical fiber structures 35 and 40 in accordance with the invention by, for example, fixing arrays of optical fibers to the respective substrate portions with their fiber ends proximate a dividing line of the substrate prior to, or after, cleaving. In accordance with this method, the substrate portions are relied upon to facilitate positioning of the optical fiber ends 38 and 43 at the desired matching distances to the particular corresponding substrate surfaces. Greater care should be taken with this method when fixing the optical fibers 37 and 42 to achieve such matching distances with the optical fiber ends 38 and 43.

In accordance with another fabrication method of the invention, self-alignment between optical fiber ends is achievable by fixing the array of optical fibers to first and second portions of an uncleaved common substrate. Then, such structure is cleaved along the optical fiber array to form the desired cleaved structure portions. In this manner, the optical fiber ends are self-aligned at substantially identical distances from the particular respective substrate surfaces without the greater care required in the previously described fabrication method. An exemplary common optical fiber structure 100 for use in producing the first and second optical fiber structures 35 and 40 in accordance with such a fabrication method is shown in FIG. 3.

The structure 100 includes optical fibers 105 fixed within two grooved substrates 110 and 115. More specifically, the optical fibers 105 are fixed within respective grooves 120 and 125 formed within facing surfaces of the substrates 110 and 115. The optical fibers 105 extend through the substrates 110 and 115 and are substantially parallel to a bottom surface 130 of the substrate 115. In order to form the optical fiber structures 35 and 40 of FIGS. 1 and 2, the optical fiber structure 100 is cleaved into two parts across the optical fibers 105 in a straight line, such as at the dashed line A in FIG. 3. Suitable cleaving methods include, for example, sawing with a diamond blade dicing saw, diamond scribing and then bending to produce the structure separation, or any other method of separating the structures 35 and 40 from a common structure.

Figure 3:
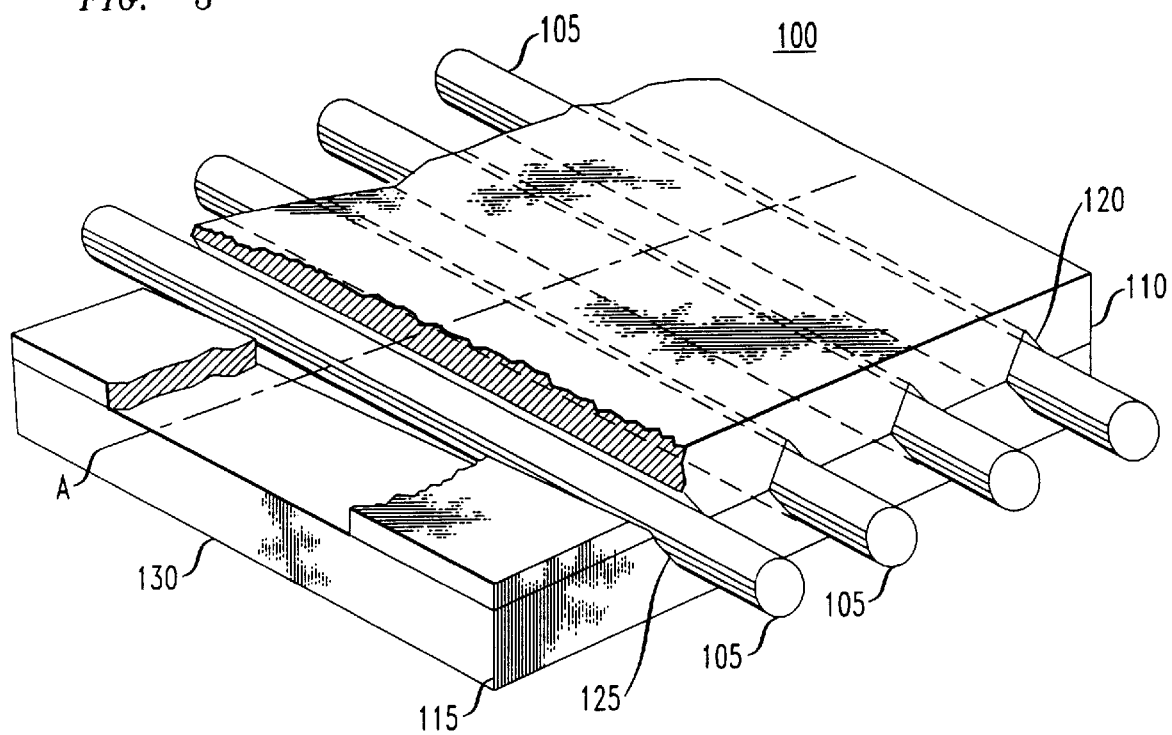
FIG. 3 is perspective partial cut-away view of a exemplary optical fiber structure that can be used to form the cleaved optical fiber structures in the switch of FIGS. 1 and 2.

The resulting cleaved structures 35 and 40, shown in FIG. 1, from the structure 100 have optical fibers ends 38 and 43 at the cleaved edges 39 and 44 aligned at substantially matching distances to the bottom flat substrate surface 130, shown in FIG. 3. Thus, the resulting waveguide ends 38 and 43 formed after cleaving, as shown in FIG. 1, are aligned in the Y-direction when the cleaved structures 35 and 40 are mounted on the aligned flat base surfaces 7 and 17. Accordingly, the desired switch connection and alignment in the X-direction are achieved by movement of the moveable base 15. The desired alignment resolution is attained by selecting the appropriate thread spacing of the shaft 25 and rotation resolution of the motor 30.

In FIG. 3, the optical fibers 105 are shown parallel to the bottom surface of the respective optical fiber structures such as the surface 130 for ease of illustration. However, it should be readily understood that the optical fibers need not have such a parallel orientation and that it is only critical that the particular fibers for which mechanical switch connection is desired be substantially equidistant from the substrate bottom surface in the region cleaved according to the invention.

An exemplary method for assembling the optical fiber structure 100 is to sandwich the respective optical fibers 105 and, for example, a heat-curable adhesive in the groves 120 and 125 in the facing surfaces of the substrates 110 and 115. Then, sufficient heat and pressure is applied to the resulting assembly to produce the structure 100. Such a formation technique and other exemplary formation techniques useable for producing the structure 100 are employed for producing conventional optical fiber array connectors and coupler employing grooved substrates described in, for example, U.S. Pat. Nos. 4,762,387, 4,725,114 and 4,639,074, assigned to the assignee of the invention, as well as E. J. Murphy, "Fiber Attachment for Guided Wave Devices", *J. of Lightwave Technol.*, vol. 6, no. 6, pp. 862–871 (June 1988), which are all incorporated by reference herein.

It is possible to employ single or multi-mode optical fibers for the optical fibers 105 including conventional single or multi-mode optical fibers having outside diameters on the order of 125 $\mu$m and core diameters on the of 10 $\mu$m and 62.5 $\mu$m, respectively. If conventional single mode optical fibers are used, then it is advantageous to increase the effective core diameter from 10 $\mu$m up to approximately 30 $\mu$m in the fiber section to be cleaved by heating that section of the optical fibers at a particular temperature to increase the index of refraction of the fiber region surrounding the core. Such a method for expanding the effective core of optical fibers is known in the art and described in, for example, K. Shiraishi et al., "Beam Expanding Fiber Using Thermal Diffusion of the Dopant", *J of Lightwave Technol.*, vol. 8, no. 8 (August 1990), which is incorporated by reference herein. The expansion of the effective core of the optical fibers in the section of the structure cleaved in accordance with the invention permits the use of lower alignment tolerances for establishing optical fiber connections than with non-expanded signal mode optical fibers. It is possible to heat the optical fiber sections to cause the effective increase in the fiber core diameter prior to securing the fibers 105 to the substrates 110 and 115.

It is possible for the substrates 110 and 115 to have exemplary dimensions on the order of approximately 1 mm thick, 1 cm along the length of the grooves 120 and 125, and 0.5 cm across the grooves 120 and 125 for securing 12 to 24 optical fibers 105. The separation between optical fiber centers is not critical for practicing the invention. It is convenient to employ separations between optical fiber centers on the order of 250 $\mu$m, which is a standard separation employed in commercially available fiber connection chips. It is also possible to use separations less than 250 $\mu$m between optical fiber centers. However, it is generally desirable that the separation be greater than 10 $\mu$m between the outer diameters of the optical fibers because of stray light rejection of adjacent fibers. Larger fiber separations than 250 $\mu$m are also useable but result in larger optical fiber structures with slower switching times due to the relatives distances the optical structures must be moved to achieve the desired connections. Also, it is possible to employ structures with as low as one optical fiber or greater than 24 optical fibers in accordance with the invention.

The particular shape used for the grooves 120 and 125 is not critical to the invention. However, it is desirable to employ shapes that facilitate positioning the respective optical fibers substantially equidistant from the surface 130 in a region of the cleaving line A including, substantially "V" or "U" shaped, semicircle and/or rectangular grooves. Moreover, the grooves 120 and 125 are formable in silicon substrates for the substrates 110 and 115 using, for example, conventional photo-lithographic or other milling techniques. The particular material used for the substrate is not critical to practicing the invention and, in addition to silicon, can include silica, ceramic, stainless steel or any other material upon which optical fibers can be secured.

The particular configuration used for the optical fiber structure 100 of FIG. 3 is for illustration purposes only and it possible to employ numerous other optical fiber structure configurations in accordance with the invention that are useable for producing the advantageous cleaved structures 35 and 40, shown in FIG. 1. For example, it is possible to omit the substrate 115 from the configuration in FIG. 3 such that the resulting optical fiber structure is formed by the optical fibers 105 secured in the grooved substrate 110. Cross-sectional view of two other exemplary configurations for optical fiber structures useable in accordance with the invention are depicted in FIGS. 4A and 4B.

Figure 4A:
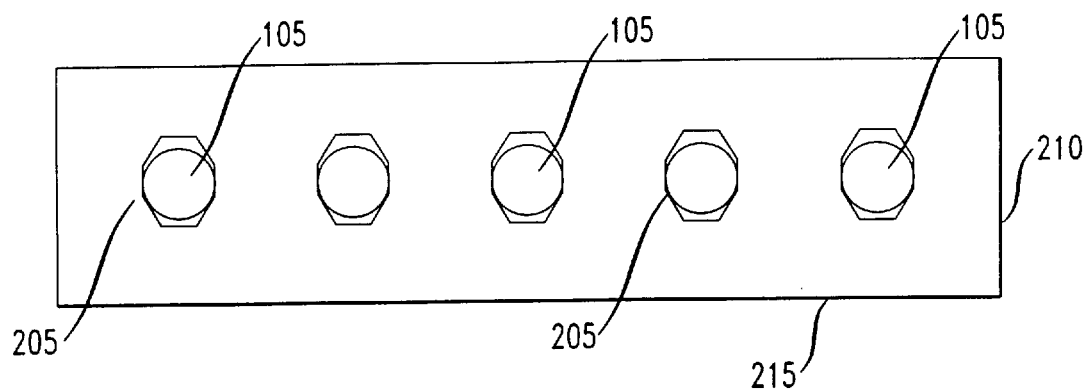
FIG. 4A and 4B are cross sectional views of alternative exemplary optical fiber structures to the structure of FIG. 3.
Figure 4B:
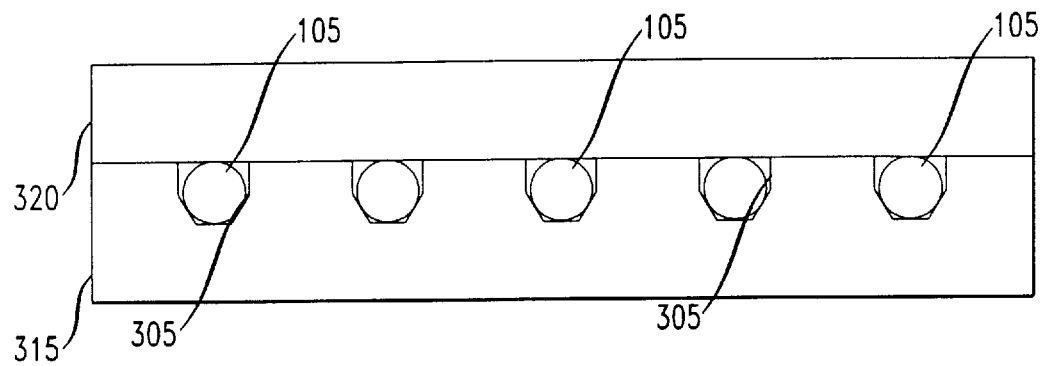

The optical fibers depicts in FIGS. 4A and 4B and FIG. 3 are represented by the same reference number 105 for clarity. In the configuration shown in FIG. 4A, the optical fibers 105 extend through apertures 205 in a single substrate 210. The apertures are formed by, for example, drilling for positioning the optical fibers 105 substantially equidistant from a surface 215 of the substrate 210. The configuration shown in FIG. 4B secures the optical fibers 105 in grooves 305 of a substrate 315 having a depth at least that of the outside diameter of the optical fibers 105. An ungrooved substrate 320 is then secured to the substrate surface containing grooves 305 to form the desired optical fiber structure.

It should be understood that many different optical fiber structure configurations can be employed in accordance with the present invention without departing from the teaching thereof. The exemplary configurations shown in FIGS. 3, 4A, and 4B are for illustration purposes only and are not meant to be a limitation of the invention. For example, it is possible to fix an optical beam expanding/compressing device such as, for example, a grated index (GRIN) rod lenses between the optical fiber ends and the cleaved edge on the respective cleaved substrates where the fiber ends are recessed from such cleaved substrate edges to permit the use of lower alignment tolerances for establishing optical fiber connections. The length of the GRIN rod lenses determines the extent of the optical beam expansion and compression. Exemplary advantageous lengths of GRIN rod lenses employed in a switch are in the approximate range of 3.0 to 5.0 mm. As a consequence, the optical fiber ends proximate the cleaved edges are recessed at a corresponding 3.0 to 5.0 mm from the cleaved edges to enable the GRIN rod lenses to be positioned between the fiber ends and the cleaved edges.

Although several embodiments of the invention have been described in detail above, many modifications can be made without departing from the teaching thereof. All of such modifications are intended to be encompassed within the following claims. For instance, it is possible to use a variety of switch configurations including a 1×N, or an M×N configuration. Further, a light signal received by a receiving optical fiber in the optical fiber structure can be looped-back to a transmission waveguide of the switch to route the same signal elsewhere. It is also possible to arrange a switch according to the invention in a ganged stage configuration with the output of one switch stage being the input of a next stage.

The invention claimed is:

1. A mechanical optical fiber switch comprising:

first and second substrates portions cleaved from a single substrate, said first and second substrate portions having respective cleaved edges;

a plurality of optical fibers fixed to the first and second substrate portions, each optical fiber having an end positioned proximate the respective cleaved edge and at a substantially matching distance to a particular corresponding surface of the respective first and second substrate portions; and first and second bases, said first base having a surface aligned in a common plane with a surface of said second base, the particular corresponding surfaces of the substrate portions positioned on the respective aligned surfaces of the first and second base with the substrate portions' cleaved edges adjacent to and facing one another, wherein the second substrate portion is movable relative to the first substrate portion in a linear direction along the cleaved edges to selectively provide connections of the optical fiber ends fixed therein;

wherein at least one of said bases is a substantially rigid linearly movable base, said linearly movable base being translationally movable.

2. The switch of claim 1 wherein said optical fibers are secured at least partially within grooves formed within corresponding surfaces of said first and second substrate portions.

3. The switch of claim 2 further comprising at least a third substrate positioned adjacent to at least one of the first or second substrates to at least partially enclose a section of the optical fibers by said third substrate and the first or second substrates.

4. The switch of claim 3 wherein grooves are formed within said third substrate for receiving at least a portion of said optical fibers.

5. The switch of claim 2 wherein said substrate portions comprise silicon.

6. The switch of claim 1 wherein a gap between the cleaved edges of the first and second substrate portions is less than 10 $\mu$m, said gap remains unchanged throughout a full range of motion of said linearly movable base.

7. The switch of claim 6 further comprising a refractive index matching material disposed in the gap.

8. The switch of claim 1 wherein said optical fiber ends are cleaved ends positioned in a common plane with the respective first or second substrate cleaved edge.

9. The switch of claim 1 wherein the first base is secured to a bracket and wherein the linearly moveable base is unbending and movably mounted to the bracket.

10. The switch of claim 1 further comprising a light detector proximate a gap between the cleaved edges of the substrate portions.

11. The switch of claim 1, further comprising:

a mechanism for providing translational movement, wherein said substantially rigid linearly movable base is supported thereon.

12. The switch of claim 1 wherein said first and second substrate portions have apertures extending therethrough and wherein said optical fibers extend through respective ones of said apertures.

13. A mechanical optical fiber switch, comprising:

first and second substrates portions cleaved from a single substrate, said first and second substrate portions having respective cleaved edges;

a plurality of optical fibers fixed to the first and second substrate portions, each optical fiber having an end positioned proximate the respective cleaved edge and at a substantially matching distance to a particular corresponding surface of the respective first and second substrate portions;

grated index (GRIN) lenses optically connected to the optical fiber ends proximate the cleaved edge, wherein said GRIN lenses are positioned between said fiber ends and the respective cleaved edges of the substrate portions; and first and second bases, said first base having a surface aligned in a common plane with a surface of said second base, the particular corresponding surfaces of the substrate portions positioned on the respective aligned surfaces of the first and second base with the substrate portions' cleaved edges adjacent to and facing one another, wherein the second substrate portion is movable relative to the first substrate portion in a direction along the cleaved edges to selectively provide connections of the optical fiber ends fixed therein.

14. A mechanical optical fiber switch comprising:

first and second bases, said first base having a surface aligned in a common plane with a surface of said second bases; and first and second optical fiber structures cleaved from a common optical fiber structure having at least one optical fiber fixed within a first substrate, each of the first and second structures having a corresponding cleaved edge and containing said at least one optical fiber, said first and seconds structure having respective surfaces coupled to respective ones of the aligned surfaces of the first and second bases and the cleaved edges arranged adjacent to and facing one another, wherein the second structure portion is movable relative to the first structure portion in a linear direction along the cleaved edges to selectively provide connections and alignment of the optical fibers in the structures;

wherein at least one of said bases is a substantially rigid linearly movable base, said linearly movable base being translationally movable.

15. The switch of claim 14 wherein said optical fibers are secured at least partially within grooves formed within a surface of said first substrate of said optical fiber structures opposite said surfaces coupled to said bases.

16. The switch of claim 15 wherein each of said first and second optical fiber structures further comprises respective third and fourth substrates positioned adjacent to said first substrates to at least partially enclose the optical fibers between said substrates.

17. The switch of claim 16 wherein grooves are formed within said third and fourths substrates for receiving at least a portion of said optical fibers.

18. The switch of claim 14 wherein a gap between the cleaved edges of the structures is less than 10 $\mu$m, said gap remains unchanged throughout a full range of motion of said linearly movable base.

19. The switch of claim 18 further comprising a refractive index matching material disposed in the gap.

20. The switch of claim 14 wherein at least one of the structures contains at least two optical fibers arranged at substantially matching distances from said surface of the structure.

21. The switch of claim 18 further comprising a light detector proximate a gap between the cleaved edges of the structures.

22. The switch of claim 14 wherein said substrates have apertures extending therethrough and wherein said optical fibers extend through respective ones of said apertures.

23. A method of producing a mechanical optical fiber switch comprising:

fixing a plurality of one optical fibers to first and second portions of a substrate;

cleaving the substrate portions into first and second substrates, each of the first and second cleaved substrate portions having a cleaved edge, wherein ends of the optical fibers fixed to each of the first and second portions are proximate the cleaved edge and at substantially matching distances from particular respective surfaces of the substrate portions; and positioning the particular respective surfaces of the first and second substrate portion to respective surfaces of first and second bases aligned in a common plane with the substrate portions' cleaved edges adjacent to and facing one another, wherein the second substrate portion is movable relative to the first substrate portion in a linear direction along the cleaved edges to selectively align respective optical fibers;

wherein at least one of said bases is a substantially rigid linearly movable base, said linearly movable base being translationally movable.

24. The method of claim 23 wherein said step of fixing the optical fibers to the first and second portions of a substrate is performed prior to the cleaving step and wherein said fixed optical fibers are also cleaved during said cleaving step to form said ends proximate said cleaved edges.

25. The method of claim 24 further comprising the step of heating a region of the optical fiber to expand its effective core diameter in a section to be cleaved by the cleaving step.

26. The method of claim 23 wherein a gap formed between the ends of optical fibers proximate the cleaved edges of the first and second substrate portions is less than 10 $\mu$m, said gap remains unchanged throughout a full range of motion of said linearly movable base.

27. The method of claim 26 further comprising disposing a refractive index matching material in the gap.

28. The method of claim 23 wherein said step of fixing the optical fibers to the respective substrate portions is performed after the cleaving step.

29. The method of claim 23 further comprising the step of polishing said optical fiber ends.

30. The method of claim 23, wherein said step of cleaving the substrate portions into first and second portions is completed prior to the step of positioning the particular respective surfaces of the first and second substrate portion to respective surfaces of first and second bases.

31. The method of claim 23 wherein said optical fibers are secured at least partially within grooves formed within a corresponding surface of the first and second substrate portions.

32. The method of claim 23 further comprising positioning first and second portions of a second substrate adjacent to said first substrate portions to at least partially enclose the optical fibers between said substrates.

33. The method of claim 23 wherein said fixing step further comprises positioning the optical fibers through corresponding apertures that extend through the first and second substrate portions.

34. A method of producing a mechanical optical fiber switch comprising:

fixing a plurality of one optical fibers to first and second portions of a substrate;

cleaving the substrate portions into first and second substrates, each of the first and second cleaved substrate portions having a cleaved edge, wherein ends of the optical fibers fixed to each of the first and second portions are proximate the cleaved edge and at substantially matching distances from particular respective surfaces of the substrate portions;

connecting grated index (GRIN) lenses to said optical fiber ends and positioning said lenses between said optical fiber ends and said cleaved edges of the respective first and second substrate portions; and positioning the particular respective surfaces of the first and second substrate portion to respective surfaces of first and second bases aligned in a common plane with the substrate portions' cleaved edges adjacent to and facing one another, wherein the second substrate portion is movable relative to the first substrate portion in a direction along the cleaved edges to selectively align respective optical fibers.

* * * * *